United States Patent [19]

Sudduth et al.

[11] 3,983,216

[45] Sept. 28, 1976

[54] PROCESS FOR THE REMOVAL OF VINYL CHLORIDE FROM GAS STREAMS

[75] Inventors: Jerome R. Sudduth, Pasadena; Donald A. Keyworth, Houston, both of Tex.

[73] Assignee: Tenneco Chemicals, Inc., Saddle Brook, N.J.

[22] Filed: June 3, 1975

[21] Appl. No.: 583,491

[52] U.S. Cl. .............................. 423/240; 423/245; 55/71
[51] Int. Cl.² ........................................ B01D 53/34
[58] Field of Search ........... 423/210, 240, 241, 245; 55/71

[56] References Cited
UNITED STATES PATENTS 3,933,980   1/1976   Smalheiser .......................... 423/245

FOREIGN PATENTS OR APPLICATIONS 1,333,650   10/1973   United Kingdom ..................... 55/71

OTHER PUBLICATIONS

Williamson et al., "Rates of Reactions of Ozone with Chlorinated and Conjugated Olefin", Jour. Amer. Chem. Soc., vol. 90, July 31, 1968, pp. 4248–4252.

*Primary Examiner*—Earl C. Thomas
*Attorney, Agent, or Firm*—Evelyn Berlow

[57] ABSTRACT

Vinyl chloride is removed from gas streams that contain from about 10 ppm to 1000 ppm of vinyl chloride by contacting the vinyl chloride in the gas stream with ozone in the presence of activated carbon. The gas streams treated in this way contain less than about 1 ppm of vinyl chloride and no detectable amount of ozone or ozonides.

7 Claims, No Drawings

PROCESS FOR THE REMOVAL OF VINYL CHLORIDE FROM GAS STREAMS

This invention relates to a process for the removal of vinyl chloride from gas streams.

When vinyl chloride is polymerized in an aqueous medium by suspension or emulsion polymerization techniques, there is obtained a latex or slurry that contains polyvinyl chloride and up to about 5% by weight of vinyl chloride. Most of the unreacted monomer is usually removed by heating the latex or slurry under reduced pressure to about 65°C. This stripping process produces large volumes of gases that contain low concentrations of vinyl chloride.

In view of the recently-developed safety standards that require that the amount of vinyl chloride in the atmosphere that workers breathe be maintained at very low levels, it is necessary that the vinyl chloride in the effluent gas streams be recovered or destroyed so that these requirements can be met.

A number of procedures have been proposed for the removal of vinyl chloride from gas streams that contain a low concentration of vinyl chloride, but none has proven to be entirely satisfactory. Procedures that involve its adsorption on activated carbon are effective in removing vinyl chloride from gas streams, but carbon has a limited capacity for the adsorption of vinyl chloride, and when the carbon has adsorbed from about 5 to 20% by weight of vinyl chloride it is saturated and must be regenerated. The activated carbon gradually loses its ability to adsorb vinyl chloride and must be replaced by fresh activated carbon at frequent intervals. Vinyl chloride and other compounds that are desorbed from the surface of the carbon must be recycled to the process or destroyed.

Among the chemical methods that have been proposed for the destruction of vinyl chloride in gas streams is reaction with ozone. This method has the disadvantage of being slow and requiring long residence times to reduce the vinyl chloride content of the gas stream to 1 ppm or less. In addition, it is difficult to meter ozone into the gas streams in amounts that will destroy substantially all of the vinyl chloride without leaving an appreciable amount of ozone in the effluent gas. There are also environmental problems arising from the presence in the effluent gas of ozonides formed by the reaction of vinyl chloride with ozone.

In accordance with this invention, it has been found that the vinyl chloride content of gas streams that contain from about 10 ppm to 1000 ppm of vinyl chloride can be reduced to 1 ppm or less by contacting the vinyl chloride in the gas stream with ozone in the presence of activated carbon. This treatment quickly reduces the vinyl chloride content of the gas stream to the desired level without adding ozone, ozonides, or other noxious compounds to it. Because the surface of the activated carbon is continuously renewed, it functions with the efficiency of fresh activated carbon for long periods of time.

The manner in which the process is carried out is not critical. Ozone may be brought into contact with vinyl chloride that has been adsorbed on the surface of activated carbon, vinyl chloride may be brought into contact with ozone that has been adsorbed on the surface of activated carbon, or a gas containing a mixture of vinyl chloride and ozone may be brought into contact with activated carbon.

In a preferred embodiment of the invention, a gas stream that contains from about 500 moles to 2000 moles of ozone per million moles of gas, which is preferably air, is added to a gas stream that contains from about 10 parts to 1000 parts by weight per million parts by weight of vinyl chloride in an amount that will provide at least 1.0 mole of ozone per mole of vinyl chloride in the gas stream. The resulting gas mixture is then passed through a bed of activated carbon. The gas stream leaving the carbon bed contains 1 ppm or less of vinyl chloride and 1 ppm or less of ozone and ozonides, as determined by the analytical methods that are used industrially for these compounds.

Particularly advantageous results have been obtained when an air stream containing from 700 mole ppm to 1400 mole ppm of ozone is added to a gas stream that contains from 100 ppm to 300 ppm of vinyl chloride in an amount that provides from 1.0 mole to 1.5 moles of ozone per mole of vinyl chloride.

This process, which can be carried out intermittently or continuously, can be run for long periods of time without substantial decrease in the adsorptive capacity of the activated carbon.

Analysis of the residual material on the activated carbon has shown that carbon dioxide is the main product of the ozonolysis of vinyl chloride adsorbed on carbon. The ozone that does not react with the vinyl chloride either decomposes in the presence of activated carbon or reacts with the carbon to form carbon dioxide.

The invention is further illustrated by the following examples.

EXAMPLE 1

An air stream that contained 1400 ppm of ozone was fed into a gas stream that contained 150 ppm of vinyl chloride at such a rate that the resulting gas mixture contained 1.2 moles of ozone per mole of vinyl cloride. This gas mixture was passed through a bed of activated carbon (Pittsburgh SGL grade) at the rate of 0.75 liter per minute. The effluent gas contained less than 10 parts per billion (ppb) of vinyl chloride and an amount of ozone that was undetectable by the iodometric method.

EXAMPLE 2

An air stream that contained 282 wt. ppm of vinyl chloride was passed through an ozonator and then through a bed of activated carbon at the rate of 0.5 liter per minute. The gas stream, which contained 1000 ppm of ozone when it entered the carbon bed, contained less than 10 parts per billion of vinyl chloride and an amount of ozone that was undetectable by the iodometric method when it left the carbon bed.

EXAMPLE 3

Two 5 gram portions of activated carbon (Pittsburgh SGL grade) were saturated with vinyl chloride. In each case about 13 percent by weight or 6.5 millimoles of vinyl chloride was adsorbed.

One of the portions of treated carbon was contacted with a stream of air that contained 1000 ppm of ozone at a flow rate of 0.5 liter per minute for 4.5 hours. A total of 5.5 millimoles of ozone was used.

Both portions of vinyl chloride-treated carbon were evacuated into a vacuum chamber of 247 ml. capacity. The ozone-treated sample produced 156 torr of gas; the other sample produced 161 torr of gas. The gases so produced were condensed using a cold trap (liquid nitrogen). The trap material was analyzed by mass spectroscopy. The results obtained, after correction for $CO_2$ on the carbon before exposure to vinyl chloride, were as follows:

| Composition of Material Desorbed From Carbon (Mole %) | | |
|---|---|---|
| | Sample Treated with Ozone | Sample Not Treated with Ozone |
| Vinyl Chloride | 29.1 | 100 |
| Formaldehyde | 6.0 | — |
| Carbon Dioxide | 64.9 | — |

From these data, it will be seen that the main product of the ozonolysis of vinyl chloride that had been adsorbed on carbon was carbon dioxide. Other ozonolysis products, which were not adsorbed by the carbon, were carbon monoxide and hydrogen chloride.

COMPARATIVE EXAMPLE

Fifty milliliters of air that contained 1400 mole ppm of ozone was blended with 50 ml. of air that contained 282 ppm of vinyl chloride and the mixture was analyzed periodically. The following results were obtained:

| Time From Mixing | Vinyl Chloride ppm | % Vinyl Chloride Destroyed |
|---|---|---|
| 1 minute | 117 | 17 |
| 3 minutes | 68 | 52 |
| 5 minutes | 43 | 70 |
| 7 minutes | 33 | 77 |

These data when plotted as log vinyl chloride vs. time show that the reaction of vinyl chloride with ozone is first order with respect to vinyl chloride concentration, and that $t^{1/2}$ is 2.7 minutes.

What is claimed is:
1. The process for the removal of vinyl chloride from a gas stream that contains from 10 parts to 1000 parts by weight of vinyl chloride per million parts by weight of gas that comprises contacting the vinyl chloride in said gas with ozone in the presence of activated carbon.
2. The process of claim 1 wherein a first gas stream that contains from 500 moles to 2000 moles of ozone per million moles of gas is added to a second gas stream that contains from 10 parts to 1000 parts by weight of vinyl chloride per million parts by weight of gas to form a gas mixture that contains at least 1.0 mole of ozone per mole of vinyl chloride and said gas mixture is passed through a bed of activated carbon.
3. The process of claim 2 wherein said first gas stream contains 700 mole ppm to 1400 mole ppm of ozone.
4. The process of claim 2 wherein said first gas stream is an air stream that contains from 700 moles to 1400 moles of ozone per million parts of air.
5. The process of claim 2 wherein said second gas stream contains from 100 ppm to 300 ppm of vinyl chloride.
6. The process of claim 2 wherein the gas mixture that is passed through the bed of activated carbon contains from 1.0 mole to 1.5 moles of ozone per mole of vinyl chloride.
7. The process of claim 1 wherein a gas stream that contains from 10 ppm to 1000 ppm of vinyl chloride is passed through a bed of activated carbon until the surface of the carbon is saturated with vinyl chloride and a gas stream that contains from 500 mole ppm to 2000 mole ppm of ozone is passed through the bed of saturated activated carbon until substantially all of the adsorbed vinyl chloride has undergone ozonolysis.

* * * * *